United States Patent [19]
Niedermeier et al.

[11] Patent Number: 5,828,852
[45] Date of Patent: Oct. 27, 1998

[54] METHOD FOR OPERATION OF A BUS SYSTEM FOR HIGHLY FLEXIBLE AND QUICK DATA TRANSMISSION BETWEEN UNITS CONNECTED TO THE BUS SYSTEM AND CONFIGURATION FOR CARRYING OUT THE METHOD

[75] Inventors: Thomas Niedermeier, Rosenheim; Peter Rohm, Pfaffenhofen/Ilm; Richard Schmid, München, all of Germany; David Flynn, Cambridge, Great Britain; Peter Klapproth, Je Eindhoven, Netherlands; Frederik Zandveld, CL Bergeyk, Netherlands; Jacobus Christophorus Koot, TS Eindhoven, Netherlands; Andrew Michael Jones, Bristol; James Graham Matthew, Wiltshire, both of Great Britain; Bruno Douady, Paris, France

[73] Assignees: Siemens Aktiengesellschaft, Munich, Germany; Advanced Risc Machines Ltd., Cambridge, United Kingdom; Philips Electronics N.V., Eindhoven, Netherlands; Inmos Ltd., Bristol, United Kingdom; Matra MHS S.A., Nantes, France

[21] Appl. No.: 562,802

[22] Filed: Nov. 27, 1995

Related U.S. Application Data

[63] Continuation of PCT/EP94/01711 May 26, 1994 published as WO94/28487 Dec. 8, 1994.

[30] Foreign Application Priority Data

May 26, 1993 [DE] Germany .......................... 43 17 567.8

[51] Int. Cl.⁶ .................................................... G06F 13/00
[52] U.S. Cl. .......................................... 395/290; 395/309
[58] Field of Search .................................... 395/290, 309, 395/287, 200.05, 293, 297

[56] References Cited

U.S. PATENT DOCUMENTS

| | | |
|---|---|---|
| 4,481,580 | 11/1984 | Martin et al. . |
| 4,818,985 | 4/1989 | Ikeda . |
| 5,127,089 | 6/1992 | Gay et al. . |
| 5,131,085 | 7/1992 | Eikill et al. .............................. 395/290 |
| 5,140,680 | 8/1992 | Best ........................................ 395/290 |
| 5,257,356 | 10/1993 | Brockmann et al. .................... 395/290 |
| 5,297,292 | 3/1994 | Morimoto et al. ...................... 395/290 |
| 5,467,295 | 11/1995 | Young et al. ........................ 395/20.05 |
| 5,544,332 | 8/1996 | Cheu ....................................... 395/288 |
| 5,555,425 | 9/1996 | Zeller et al. ............................ 395/800 |

FOREIGN PATENT DOCUMENTS

| | | |
|---|---|---|
| 0 179 936 | 5/1986 | European Pat. Off. . |
| 0 444 711 | 9/1991 | European Pat. Off. . |
| 0 507 954 | 10/1992 | European Pat. Off. . |

OTHER PUBLICATIONS

IBM Technical Discl. Bulletin vol.28 No. 12 May 1986, pp. 5329–5333, "High–Speed Processor Bus Arbitration".

Elektronik Report 10A Oct. 1990, pp. 58–62, "Vorstellung des MC68340" (Introduction of the MC68340), in German.

Fäer, Gerog. *Bussysteme–Parallele und Serieele Bussysteme, Lokale Netze.* pp. 46–48. R. Oldenburg Verlag, 1987. (filed in German).

*Primary Examiner*—Glenn A. Auve
*Attorney, Agent, or Firm*—Herbert L. Lerner; Laurence A. Greenberg

[57] ABSTRACT

A method and a circuit configuration for operation of a bus system. A bus includes a bus control unit which controls only an arbitration and when time is exceeded during a data transmission. An actual data transmission is determined in a respective active master unit and an addressed slave unit. A characteristic of a bus cycle, such as a data length, access to a data area or a control area and a waiting cycle, is transmitted in encoded form through a multiplicity of control lines.

10 Claims, 2 Drawing Sheets

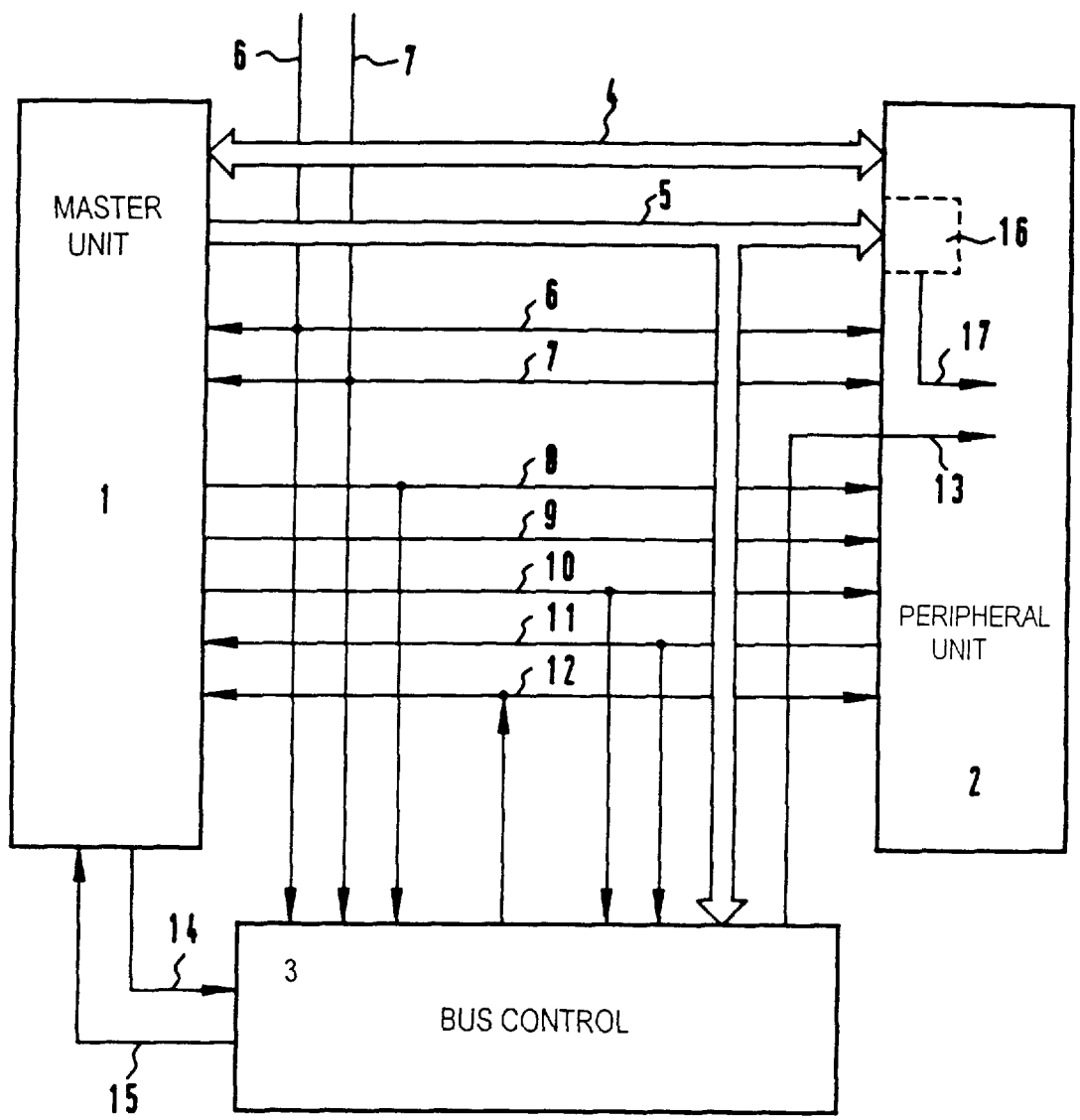

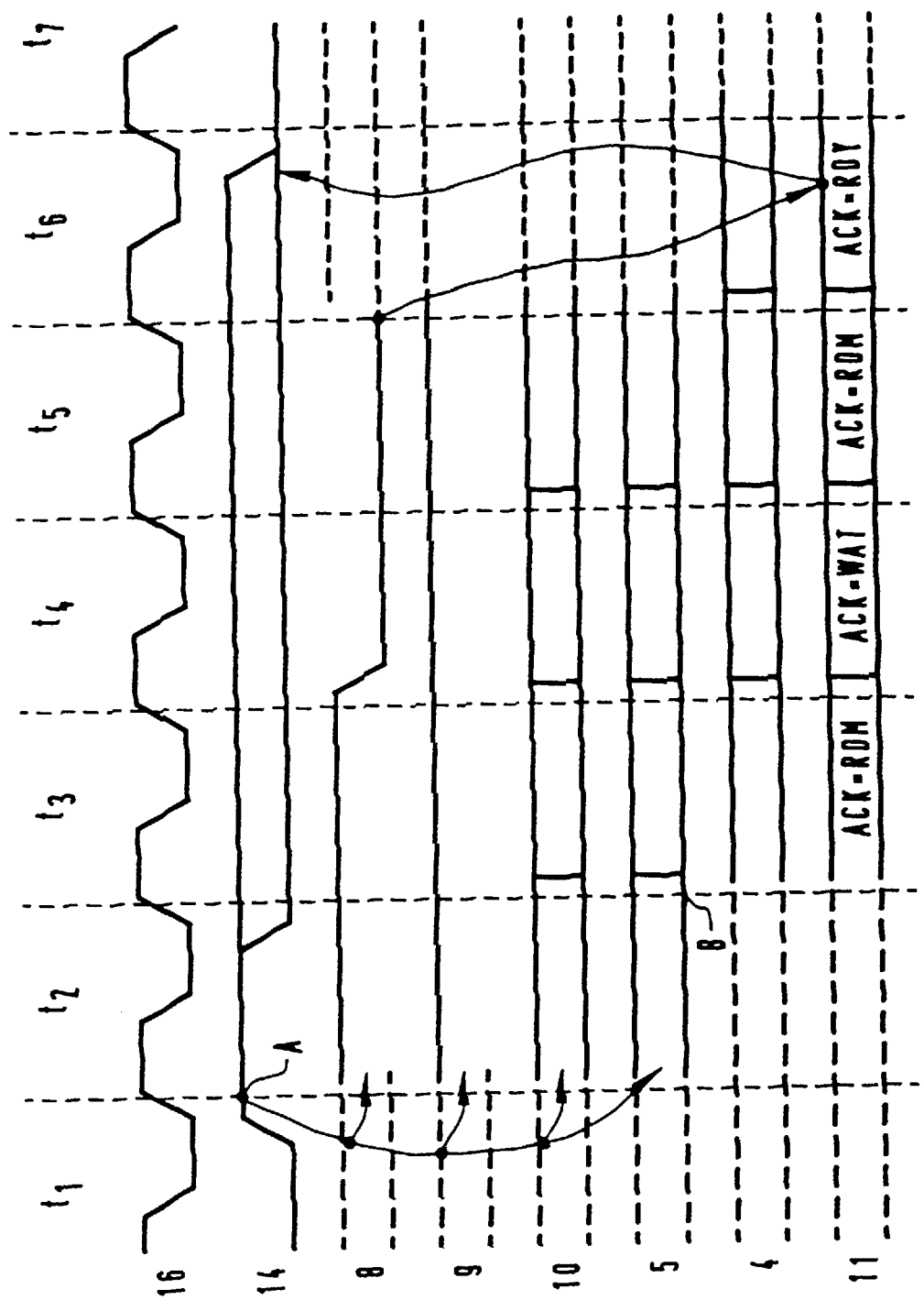

METHOD FOR OPERATION OF A BUS SYSTEM FOR HIGHLY FLEXIBLE AND QUICK DATA TRANSMISSION BETWEEN UNITS CONNECTED TO THE BUS SYSTEM AND CONFIGURATION FOR CARRYING OUT THE METHOD

CROSS-REFERENCE TO RELATED APPLICATION

This application is a Continuation of International Application Serial No. PCT/EP94/01711, filed May 26, 1994 published as WO94/28487 Dec. 8, 1994.

BACKGROUND OF THE INVENTION

1. Field of the Invention

The invention relates to a method for operation of a bus system and to a circuit configuration for carrying out the method.

Bus systems for microprocessors, in particular for microcontrollers, in which a bus system is provided for a link from peripheral units to a processor core have been disclosed, for example, in the publication entitled: Elektronik Report 10a, October 1990. An outline of a structure of such a microprocessor is illustrated therein on page 58 et seq, and in particular in an associated figure on page 59. A microprocessor described therein includes a central processor unit known as a "core processor" and various peripheral units known as "serial I/O", "Timer" and "DMA controller". All of the units are connected to one another through an internal "inter-module bus". A "system interface" bus control unit is also provided, which connects an externally connectable bus to the internal bus.

A peripheral unit which is connected to that bus is normally accessed in such a manner that the accessing functional unit, which is generally the central processor unit or another bus master, applies the addresses of the peripheral unit to be addressed to the databus, and applies the data to be transmitted to the databus. The data transmission is then carried out in widely different manners through the use of control signals. In the case of a bus system which is operating by using the demultiplexed mode, the address signals are transmitted simultaneously to associated address lines, while in contrast, in the case of bus systems using the multiplex mode, a part of the address is placed on the databus and it is buffer-stored by a memory in the peripheral unit, and the remaining address signals are transmitted on address lines of the address bus.

If the address is present, then the associated peripheral unit is selected and the corresponding data are placed on the databus by the central processor unit or the addressed peripheral unit, depending on whether writing or reading is taking place. During the actual data transmission, the addresses must be present on the address bus constantly in order thus to activate the desired, addressed peripheral unit and to maintain valid data transmission.

However, if very fast central processor units are used, such as RISC (reduced instruction set computer) processors, for example, then the transmission rate on such buses is frequently inadequate. Efforts are directed at ever higher transmissions rates.

2. Summary of the Invention

It is accordingly an object of the invention to provide a method for operation of a bus system and a configuration for carrying out the method, which overcome the hereinafore-mentioned disadvantages of the heretofore-known methods and devices of this general type and which make data transmission possible as flexibly and quickly as possible between units that are connected to the bus.

With the foregoing and other objects in view there is provided, in accordance with the invention, in a method for operation of a bus system having at least one master unit, at least one slave unit, a bus through which the at least one master unit communicates with the at least one slave unit, and a bus control unit for controlling the communication through the bus, the improvement which comprises controlling an assignment of the bus to a master unit with the bus control unit; transmitting data between the master unit and an addressed unit under control of the master unit and the addressed unit; and transmitting a respective characteristic of a bus cycle in encoded form with the master unit or the slave unit through at least one control line of the bus.

In accordance with another mode of the invention, there is provided a method which comprises determining a length of the transmitted data through a multiplicity of control lines.

In accordance with a further mode of the invention, there is provided a method which comprises determining an access area through a multiplicity of control lines.

In accordance with an added mode of the invention, there is provided a method which comprises determining a number of waiting cycles through a multiplicity of control lines.

In accordance with an additional mode of the invention, there is provided a method which comprises acknowledging a data transmission by the addressed unit through at least one control line.

In accordance with yet another mode of the invention, there is provided a method which comprises indicating whether data are ready or whether data are being processed with the addressed unit, through a multiplicity of control lines.

In accordance with yet a further mode of the invention, there is provided a method which comprises indicating whether additional waiting cycles have been inserted and/or whether any error states have occurred with the addressed unit, through a multiplicity of control lines.

In accordance with yet an added mode of the invention, there is provided a method which comprises indicating whether successive bus cycles are or are not carried being out without interruption with the master unit, through a control line.

In accordance with yet an additional mode of the invention, there is provided a method which comprises producing a signal terminating a data transmission after a predetermined time with the bus control unit, upon exceeding the predetermined time.

With the objects of the invention in view, there is also provided a circuit configuration for operation of a bus system, comprising at least one master unit for controlling timing of a data transmission; at least one slave unit; a bus through which the at least one master unit communicates with the at least one slave unit; and a bus control unit for controlling the communication through the bus, the bus control unit assigning or arbitrating through at least one request signal and at least one acknowledgement signal between the master unit and the bus control unit.

In accordance with another feature of the invention, the bus control unit decodes signals present on an address bus and produces at least one selection signal.

In accordance with a concomitant feature of the invention, an addressed unit decodes signals present on an address bus and produces a selection signal.

Other features which are considered as characteristic for the invention are set forth in the appended claims.

Although the invention is illustrated and described herein as embodied in a method for operation of a bus system and a configuration for carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is an outline block circuit diagram of a configuration according to the invention; and FIG. 2 is a time-domain waveform diagram of various signals relating to the bus system according to the invention.

DESCRIPTION OF THE PREFERRED EMBODIMENTS

Referring now to the figures of the drawing in detail and first, particularly, to FIG. 1 thereof, there is seen a bus system according to the present invention having a master unit 1, for example a central processor unit such as an RISC processor, for example. The master unit 1 communicates through a databus 4 which is operated bidirectionally, and through a unidirectional address bus 5, as well as further control lines 6 . . . 15 which are likewise unidirectional, for example, with further master units or with slave units 2. The number of master units and slave units is system-dependent and is not defined. A bus control unit 3 controls an assignment of the bus (arbitration) through the lines 14 and 15. For this purpose, the bus control unit 3 is connected to each master unit 1 through a signal line pair 14/15. In addition, the address bus 5 as well as the control signal lines 6, 7, 8, 10 and 11 are fed to the bus control unit 3. The control unit 3 can always assign only one master unit to the bus for one clock period of the clock signal line 6. If the bus is occupied for an excessively long period for the system, with the occupation being caused by a slave unit 2, the bus control unit 3 can disconnect the slave unit and the master unit from the bus through the signal 12. A bus occupancy time (number of clock cycles) determining the disconnection can be permanently or variably defined in the bus control unit.

In the illustration of FIG. 1, one peripheral unit 2 is connected, by way of example, to this bus. A multiplicity of peripheral units can, of course, be connected to this bus. A peripheral unit may be either a master peripheral unit or a slave peripheral unit.

A reset line, which is connected to all of the units that are connected to the bus, is designated by reference numeral 7. A signal line which indicates whether or not a master unit is carrying out successive cycles is designated by reference numeral 8. A read/write line is designated by reference numeral 9. The line designated by reference numeral 10 may include a plurality of lines, for example four individual lines, which are used for an encoded transmission of further characteristics of a bus cycle.

A slave unit 2 can indicate through the control bus 11 that valid signals are present on the databus 4 or have been recognized by a slave unit 2. The control bus 11 likewise includes a plurality of lines, for example 3 lines. One line 13 is used for selection of a slave unit 2.

The bus signals will be described below in more detail:

Signals of the bus control unit 3:

Signal on line 14: Bus Request; a master unit 1 uses this signal to request the bus to transmit data to a slave unit 2.

Signal on line 15: Bus Grant; the bus control unit 3 uses this signal to tell the master unit 1 when it can start to transmit data on the bus.

Signal on line 12: Timeout; the bus control unit 3 uses this signal to terminate data transmission between a master unit 1 and a slave unit 2. If this signal is active, the master unit 1 and the slave unit 2 must disconnect the signal lines which they are actively using.

Signal on line 13: Unit Select; this signal input must be made available to the bus by every unit which can be addressed as a slave unit 2, in order to select it for a data transmission.

Signals of a master unit 1:

Signal on line 5: Addressbus, for example A31–A2; the address lines are driven by the master unit 1 involved in a data transmission.

Signal on line 8: Lock; a master unit 1 can use this signal to carry out successive bus cycles without the data transmission being interrupted by another master unit 1.

Signal on line 9: Read/Write; a master unit 1 uses this signal at the start of the bus cycle to indicate to that slave unit 2 which has been selected through the signal line 13 whether data will be transmitted from or to this slave unit in a bus cycle.

Signal on lines 10: Operation Code; the master unit 1 uses these signals in addition to the signals 8 and 9 to transmit further characteristics of a bus cycle in encoded form. Such characteristics are, for example, the size of the transmitted data unit (8/16/32 bits), access to the data area or control area, and wait cycle.

Signals of a slave unit 2:

Signal on lines 11: Acknowledge Code; these encoded signals are generated by the slave units 2. The slave units 2 use these signals to indicate, for example, whether data are ready, whether data have been processed, whether wait cycles have been inserted and whether error states have or have not occurred in the current bus cycle.

Other signals:

Signal on line 4: Databus D31–D0; this is the bidirectional databus through which, for example, data with a length of 8, 16 or 32 bits are transmitted.

Signal on line 6: Clock; this signal is the clock signal for the bus and is used to control the timing of the signal sequences.

Signal on line 7: Reset; this signal is a reset signal for the bus and can be active asynchronously and inactive synchronously.

Data transmission on the databus 4 always takes place between a master unit 1 and a slave unit 2. After assignment of the bus by the bus control unit 3, the master unit 1 uses an address which is transmitted on the address bus 5 to select that slave unit 2 which is required for data transmission. This address can be decoded centrally in the bus control unit 3 or locally in a decoder 16 at the location of the slave unit 2. Every unit which can be addressed as a slave 2 (that is to say, possibly a master unit as well) must provide an input signal on the line 13 for this purpose. A slave unit 2 with a decoder 16 can then have an additional signal on a line 17 for selection of the respective slave unit 2.

The master unit 1 and the slave unit 2 communicate with one another through the control signals on the lines 8, 9, 10, the address bus 5 (from the master to the slave) and through the control signals on the lines 11 (from the slave to the master).

FIG. 2 shows the waveform of various signals. The numbering of the signals corresponds to the numbers of the lines defined in FIG. 1.

FIG. 2 shows the transmission of 3 contiguous data units (of 32 bits) from a slave unit 2 to a master unit 1. The clock signal on the line 16 is used as a reference for the timing of the bus. The bus is in a waiting state before and after data transmission on the bus (time periods $t_1$ and $t_7$).

At a time A, the bus control unit 3 assigns the master unit 1 to the bus. It starts to transmit data and drives the signals on the lines 8, 9, 10 and the address bus 5. During the time period $t_2$, the address information on the address bus 5 is decoded centrally or locally and is buffer-stored at a time B as a selection signal in the slave unit. The signals on the lines 9 and 10, which contain further information about the bus cycle that has started (write or read, quantity of data) are likewise buffer-stored in the selected slave unit. The signal on the line 8 indicates to the bus control unit at the end of the period $t_2$ that there is another bus cycle following and that the bus cannot be released for a new master unit.

At a start of a period $t_3$, the slave unit 2 (the reading process) starts to drive the databus 4 and the signals on the lines 11. The combination of the signals on the lines 11 (RDM=Ready, more data still to follow) indicates in the period $t_3$ that the data from the first read cycle are available and can be accepted by the master unit 1. In parallel with the data from the first read cycle, the master unit 1 outputs the address and the signals on the lines 8, 9 and 10 for the second read cycle in the period $t_3$ (pipelining). When a period $t_4$ starts, the address and the signals on the lines 8, 9 and 10 for the third read cycle are output. The signal on the line 8 indicates that the data transmission between the master unit 1 and the slave unit 2 will be complete after the third read cycle. Since a wait cycle (WAT =wait data not yet available) is required for the data for the second read cycle, which is controlled through the signals on the lines 11, the signals on the lines 8, 9, 10 and the address 5 cannot be assessed until the end of a period $t_5$.

With valid data in the period $t_5$ and the level of the signal on the line 8 at the end of the period $t_5$ the master unit 1 stops driving the bus signals on the lines 8, 9, 10 and the address bus 5. The slave unit 2 drives the databus 4 and the signals on the lines 11 until valid data are indicated through the signals on the lines 11. In FIG. 2, this is the case at the end of a period $t_6$ (ACK=Ready, bus cycle ended). In addition, at the end of the period $t_6$, the bus control unit 3 can decide whether or not, if an appropriate request is present (that does not affect FIG. 2), another master unit 1 is to be assigned to the bus. Thus, another master unit 1 could start to drive the signals on the lines 8, 9, 10 and the address bus 5 at the earliest in a period. $t_7$, as a result of which a slave unit 2 also cannot drive the signals on the lines 4 and 11 again until the bus cycle after the period $t_7$. In this way, the simultaneously active driving of bus signal lines (signal conflict) is avoided.

We claim:

1. In a method for operation of a bus system having at least one master unit, at least one slave unit, a bus through which the at least one master unit communicates with the at least one slave unit, and a bus control unit for controlling the communication through the bus, the improvement which comprises:

controlling an assignment of the bus to a master unit with the bus control unit;

transmitting data between the master unit and an addressed unit under control of the master unit and the addressed unit; and transmitting respective data of a bus cycle in encoded form with the master unit or the slave unit through at least one control line of the bus.

2. The method according to claim 1, which comprises determining a bit length of the transmitted data through a multiplicity of control lines.

3. The method according to claim 1, which comprises determining an access to one of a data area and a control area through a multiplicity of control lines.

4. The method according to claim 1, which comprises determining a number of waiting cycles through a multiplicity of control lines.

5. The method according to claim 4, which comprises acknowledging a data transmission by the addressed unit through at least one control line.

6. The method according to claim 5, which comprises indicating whether data are ready or whether data are being processed with the addressed unit, through a multiplicity of control lines.

7. The method according to claim 6, which comprises indicating at least one of whether additional waiting cycles have been inserted and whether any error states have occurred with the addressed unit, through a multiplicity of control lines.

8. The method according to claim 5, which comprises indicating at least one of whether additional waiting cycles have been inserted and whether any error states have occurred with the addressed unit, through a multiplicity of control lines.

9. The method according to claim 1, which comprises indicating, with the master unit through a control line, whether successive bus cycles are or are not being carried out without interruption with the master unit.

10. The method according to claim 1, which comprises producing a signal terminating a data transmission after a predetermined time with the bus control unit, upon exceeding the predetermined time.

* * * * *